Figure 1:
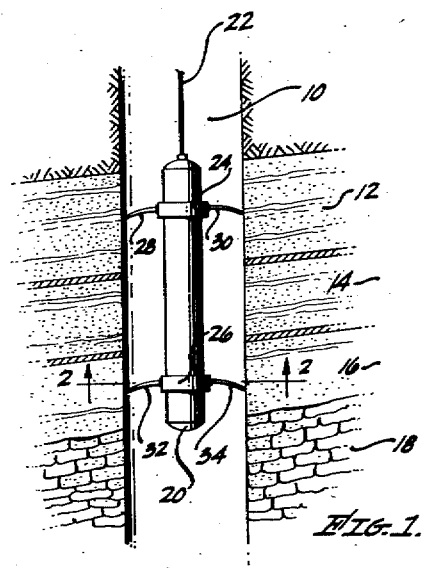

July 9, 1957 T. J. NOWAK 2,799,003
ELECTRIC LOGGING METHOD AND APPARATUS
Filed Feb. 16, 1953

INVENTOR.
THEODORE J. NOWAK,
BY
AGENT.

United States Patent Office 2,799,003
Patented July 9, 1957

2,799,003

ELECTRIC LOGGING METHOD AND APPARATUS

Theodore J. Nowak, Fullerton, Calif., assignor to Union Oil Company of California, Los Angeles, Calif., a corporation of California Application February 16, 1953, Serial No. 336,917

9 Claims. (Cl. 324—1)

This invention relates to an improved method and apparatus for reducing polarization effects encountered at electrode surfaces which contact liquid or solid media and through which electric currents are passed. Specifically, the present invention relates to an improved process and apparatus in which special radioactive electrodes are employed in the electric logging of well bores drilled into the earth's surface, in electric methods of geophysical prospecting of the subsurface, and in other processes wherein electric currents are passed through liquid and solid media by means of electrodes placed in contact therewith.

The polarization of electrodes is a phenomenon which occurs in many presently employed processes in which an electric current is passed through liquid or solid media between spaced electrodes maintained in contact with the media. The classic example of polarization is found in the electrolysis of dilute solutions, such as sulfuric acid, wherein a pair of spaced platinum electrodes is immersed in the solution and externally connected by means of electrical conductors through a circuit containing a source of electrical energy and a current indicator such as a galvanometer. Upon closing the circuit, current flow results through the external circuit and through the solution between the electrodes. The initial current is approximately equal to the voltage of the external current source divided by the resistance presented by the entire circuit. This current does not continue but rapidly falls to a considerably lower value and often to zero due to the polarization effects occurring at the surface of the electrodes in contact with the solution. A thin film of gas generated at the electrode surface presents a high resistance path for current flow between the solution and the electrode which materially increases the total resistance of the circuit and results in the decrease in current indicated above.

In such operations as electroplating, electric well logging with electrodes in contact with well fluids, and miscellaneous other electrical measurements conducted on liquids, the formation of this high resistance gas film causes excessively high voltages to be required in order to maintain a constant desired current flow in electroplating and other similar electrolysis operations and causes erroneously high resistance determinations in the measurement of the electric properties of liquids.

These adverse polarization effects are also encountered in electrical processes wherein electric currents are passed through solid media such as in the electric logging of the strata penetrated by a well bore using "scratcher electrodes" and in the well-known electrical methods for geophysical prospecting of the earth's crust. In electric logging of well bores, at least two electrodes are passed through the well bore in contact with the fluids contained therein or are forced against the exposed faces of penetrated strata. An electric current is caused to pass between the electrodes through the parallel circuits comprising the fluid surrounding them and through the strata exposed by the bore. Other modifications of the electric logging method contemplate the use of three or four or more electrodes simultaneously. In these methods the specific resistivity of the penetrated strata is determined by measurements of the impressed voltage and the resulting current flow whereby the physical nature of the surrounding strata is determined.

In the electrical methods for geophysical prospecting, electrodes in contact with the earth's surface at widely spaced points, sometimes as high as 10,000 to 15,000 feet apart, are connected to an external circuit through a source of electric current. The current flow in the external circuit is completed through the electrodes and through the subsurface strata at a depth and at a current value which is characteristic of the electrical nature of the strata. In some cases the intensity and direction of the resultant magnetic field induced by the subsurface current flow is measured at the surface by magnetometric means. In other types of electrical geophysical prospecting, pickup electrodes located generally between the spaced electrodes referred to above, are placed in contact with the earth's surface and current and voltage measurements are made with respect to the pickup electrodes.

In all of these methods a single problem is encountered in the passage of an electric current between the liquid or solid media and the electrodes placed in contact therewith. The current flow invariably results in the transport of ions to and from the electrode surfaces resulting in the deposition of materials at the electrode surface. When the material deposited is a gas, the resistance of the circuit increases greatly due to the fact that gases in general have extremely low electrical conductivities. It often occurs simultaneously that ions, which give the media contacted a relatively high electrical conductivity, are also depleted from an aqueous solution leaving a relatively low conductivity fluid having low ion concentrations immediately adjacent the electrode. This liquid together with any gas phase formed at the surface of the electrodes, imparts a tremendous increase in circuit resistance and either effects a proportionate decrease in current flow or requires an increase in the required applied voltage to maintain a given desired current flow.

In geophysical prospecting in particular, attempts to overcome this problem have involved the saturation of the earth adjacent the electrode with aqueous salt solutions, the provision of electrodes containing a zinc or copper bar in contact with a saturated solution of zinc or copper salt, and the like. The electrodes of the former kind are still subject to polarization due to gas formation, ion transport leaving an aqueous film adjacent the electrode surface and containing a deficiency of ions, etc. Although the conductivity of the earth adjacent the electrode is increased, the resistance at the electrode surface is still increased with current flow. Electrodes of the latter kind containing a metal in contact with an aqueous solution of one of its salts are not sufficiently rugged for outdoor geophysical operations. In electric logging, the current flows generally employed are relatively small and the polarization effects of increased resistance frequently mask the relatively small resistance differences which distinguish one earth stratum from another.

The present invention therefore is directed to an electrode which is physically rugged and which is not subject to the polarization effects disclosed above.

It is an object of the present invention to provide an electrode for contacting liquid or solid media or a solid media containing liquid for the passage of current therethrough and which is not subject to the resistance effects of polarization caused by ion depletion or gas film deposition.

A more specific object of this invention is to provide a nonpolarizable electrode which is provided with a radioactive source of high velocity particles incorporated therein which serves to ionize and render conductive low resistance films of gas, liquid or solids immediately adjacent the electrode surface.

A more specific object of this invention is to provide an improved process for the electric logging of well bores in which radioactive electrodes are passed through the well bore and which ionize and render conductive the fluids or solids immediately adjacent thereto.

It is also a specific object of this invention to provide an improved process for the electric geophysical prospecting of subsurface strata of the earth in which an electric current is passed through a portion of the earth's crust embraced between radioactive electrodes maintained in contact with the earth.

It is a general object of the present invention to provide an improved process free of polarization effects wherein an electric current is passed between radioactive electrodes through liquid or solid media present therebetween.

Other objects and advantages of the present invention will become apparent to those skilled in the art as the description thereof proceeds.

Briefly, the present invention comprises in its broadest aspect an electrical process in which an electric current is passed through an electric circuit containing a source of current which is electrically connected to at least two spaced electrodes, between which is disposed a liquid or solid medium through which the current is to be passed. At least one of the electrodes contacting the medium is rendered radioactive by the incorporation therein of a sufficient quantity of radioactive material which emits, due to its radioactive decay, high velocity particles which are effective at the surface of the electrode to at least partially ionize the medium immediately adjacent the electrode surface. The high velocity particles, in ionizing the film of relatively low conductivity material existing at the electrode surface, renders it capable of carrying the electric current in spite of the fact that such material would normally present a relatively high resistance to current flow. When both electrodes are subject to polarization, they both are treated according to this invention and are made radioactive.

In electrolysis processes, the deposited gas film or the relatively low conductivity mass of material formed adjacent the electrode surface by ion transport, is rendered conductive to the current flow precisely at the point at which the maximum circuit resistance occurs. By eliminating the electrical resistance in the immediately adjacent liquid or solid medium, the true resistance characteristic of the medium may be obtained. The distance from the electrode surface into the adjacent medium through which ionization is effected may be and is preferably relatively low, that is, the entire medium between the electrodes is not ionized but only a relatively thin film adjacent the electrode surface is so effected.

In the practice of the present invention, the radioactive materials employed are preferably those commonly known as alpha particle emitters. These materials are those which emit, during the radioactive process of decay, a high velocity stream of helium nuclei. Such particles are more effective in ionizing materials against which they are directed than are the radioactive compounds which emit beta particles and gamma rays. Examples of suitable alpha emitters include polonium, which is the cheapest and most common, radium, uranium, and thorium.

If desired, radioactive materials which emit gamma rays may be employed provided they are used in sufficiently high concentrations to secure ionization. Such materials include cobalt of atomic weight 60, antimony of atomic weight 124 or 125, cesium of atomic weight 137, iron of atomic weight 59, silver of atomic weight 110, and the like.

The physical incorporation of the radioactive material at the electrode surface may be effected in a variety of manners which are largely dictated by the nature of the radioactive material and the process in which electrode is employed. In electrolysis processes in which metal deposition occurs, the radioactive material must be incorporated so as not to mix with the metal deposited. In the deposition of gases at inert electrodes such as carbon, platinum, and the like, the radioactive material may be alloyed with, inlaid, or plated on the surface of or otherwise incorporated on the electrode surface. One particularly desirable form of electrode for use in electric well logging, in which the borehole wall is contacted by the electrode, comprises a sintered mixture of a solid radioactive alpha emitter and metal particles such as cobalt, iron, nickel, and the like, or silicon carbide, tungsten carbide, etc. may be used when abrasion resistant electrodes are required. In other electrode processes in which liquid anodes or cathodes are employed, the alpha emitter may be amalgamated or otherwise mixed with the electrode.

In general, electrical measurements such as are carried out with respect to solutions and in which there is no deposition of material other than the gases which cause polarization, it is suitable to plate the electrode with the radioactive material.

Figure 3:
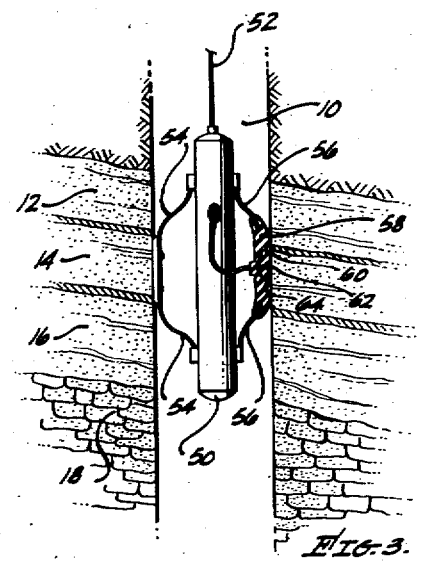
Figure 2:
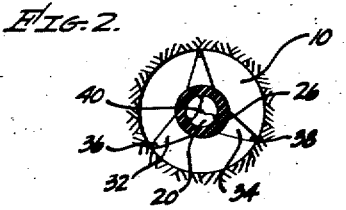
Figure 4:
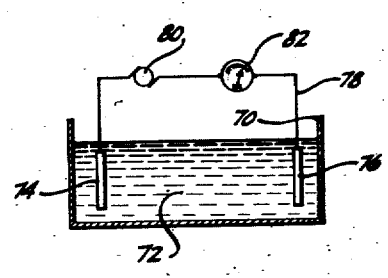
Figure 5:
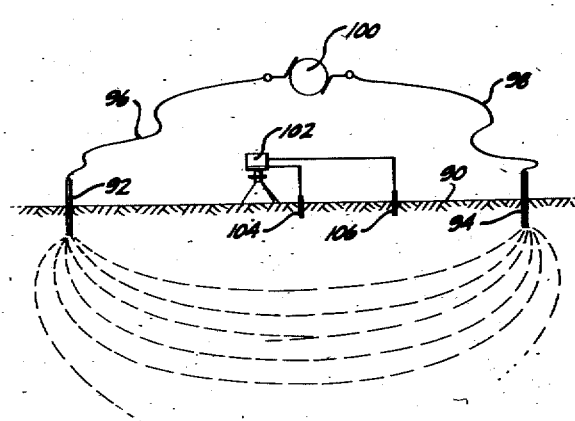

The above considerations are also applicable in the electrodes used in the various forms of electric logging and in electrical methods for geophysical prospecting. These methods in which the radioactive electrodes of the present invention are applied will be more clearly understood by reference to the accompanying drawings in which:

Figure 1 is a schematic elevation view in cross section of a portion of a well bore through which an electric logging instrument of the so-called "scratcher" type is employed, Figure 2 is a cross-sectional view of a modification of the instrument in Figure 1 and which has three electrodes spaced 120° apart, Figure 3 is a semi-schematic drawing of a modified electric logging instrument, Figure 4 is a schematic elevation view of the application of the electrodes of the present invention to the electrolysis or electroanalytical processes, and Figure 5 is a schematic drawing of one form of electrical method for geophysical prospecting.

Referring now more particularly to Figures 1 and 3, borehole 10 penetrates subsurface strata 12, 14, 16, and 18 from the surface of the earth, not shown. In the electric logging of formations exposed by such bores, a logging instrument provided with an electrode is passed through the bore with the electrodes in contact with the strata surfaces.

In Figures 1 and 2, logging instrument 20 is suspended by suspension cable 22 which also contains the electrical conductors connecting the electrodes described below with recording instruments, not shown but conventional, disposed at the surface. The body of instrument 20 is provided with a pair of insulating collars 24 and 26 from which extend "scratcher" electrodes 28, 30, 32, and 34. Two or three or more of such electrodes may be located peripherally around each collar and extend therefrom into contact with the borehole walls. In Figure 1, two electrodes are shown spaced 180° and in Figure 2, three electrodes are shown at 120° spacings.

The electrodes are constructed of a resilient electrically conducting material such as spring steel, spring bronze, and the like. They extend radially from the body of instrument 20 into contact with the borehole wall. The points or tips of these electrodes, indicated especially in Figure 2 as elements 36 and 38, contain the radioactive material described above. During the logging procedure, as the instrument is passed through the borehole, the tips of the electrodes are maintained in physical contact with the borehole walls by flexure of electrodes 32 and 34 and the like.

Any intervening liquid, gas, or solid film between the radioactive electrode tips and the exposed strata is ionized and rendered conductive by the alpha particle emission and polarization effects are eliminated, the electrode current passing directly through the ionized layer into the formation.

Electrodes 28 and 30 actually constitute a single electrode as do electrodes 32 and 34. These are connected by means of individual conductors shown in Figure 2 to conductor 40 within instrument 20. Conductor 40, together with a similar conductor, not shown but connected to electrodes 28 and 30 in the same manner, passes upwardly to the surface through suspension line 22 to conventional electric log recorder equipment.

Referring now to Figure 3, a somewhat modified electric well logging instrument 50 is provided with suspension line 52 containing three electrical conductors, not shown but leading to a recording instrument disposed at the surface. Radially disposed about the body of instrument 50 is a plurality of three flexible spring-type bow-shaped instrument centralizers 54 and 56 spaced 120° apart. These effectively maintain the instrument 50 substantially at the central axis of bore 10. Centralizers 54 and 56 spaced 120° apart. These effectively maintain the instrument 50 substantially at the central axis of bore 10. Centralizer 56 is modified to the extent that it is provided with insulating member 58 which contains electrodes 60, 62, and 64. These electrodes are brought into contact with the borehole walls by the pressure exerted by the centralizers referred to above. Each electrode contains a radioactive, preferably alpha emitting, material whereby the intervening film of gas or liquid is ionized rendering it conductive. With gas and ion depletion polarization thus eliminated, a more accurate determination of formation resistivity may be obtained.

Referring now to Figure 4, a container 70 is shown containing a body of liquid 72, such as a test liquid, the conductivity of which is to be determined. Electrodes 74 and 76 are placed in contact with the solution and connected by means of conductor 78 through current source 80 and current indicating means 82.

As an example of the effect upon electrode polarization in the apparatus shown in Figure 4, graphite electrodes 74 and 76 were dipped into a solution of 30% sulfuric acid and a voltage of 3.5 volts was impressed. A current flow of 270 milliamperes was noted initially. This current flow dropped to a value of 110 milliamperes in a period of about 30 minutes indicating extensive gas polarization of the electrodes.

A pair of new electrodes treated according to this invention and consisting of graphite compounded with uranium ore were substituted. In repeating the experiment, it is noted that no substantial decrease in current flow results over a period of as long as 24 hours.

Referring now more particularly to Figure 5, a schematic drawing of an electrical method for geophysical prospecting is shown. At spaced points on the surface 90 of the earth are located primary electrodes 92 and 94. These are connected respectively by means of conductors 96 and 98 with current source 100. The current flowing through conductors 96 and 98 passes between electrodes 92 and 94 through the subsurface as shown. Located substantially at the surface is prospecting instrument 102 which serves to measure surface indications of the subsurface current flow. In one mode of operation, instrument 102 is connected to secondary electrodes 104 and 106 to pick up an incremental surface current flow. In another modification, the instrument is connected to a pickup coil, not shown, whereby the current induced thereinto is measured to determine the electrical field intensity at the surface induced by the sub-surface current flow.

In carrying out the geophysical prospecting method described, the polarization effects of establishing and maintaining earth currents are substantially reduced and in many cases entirely eliminated by the use of earth contacting electrodes provided with alpha emitting radioactive materials.

As a specific example of an electrode suitable for use in the "scratcher" type logging instrument illustrated in Figure 1, the electrodes are provided with radioactive abrasion-resistant tips of tungsten alloyed with about 0.5%–1.0% of thorium oxide, preferably prepared from radiothorium of atomic weight 228.

A radioactive electrode suitable for either the electrical geophysical prospecting method or for the methods for well logging is prepared as a Stellite alloy and containing 40–80% cobalt 60, 20–35% chromium, 0–25% tungsten and 0.75–2.5% carbon. Sufficient quantity of the radio-cobalt is employed to produce 100 millicuries of radiation at the electrode tips.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for determining the geophysical properties of selected portions of underground geological formations which comprises maintaining at least two spaced electrodes in contact with a selected portion of the earth, impressing a voltage difference between said electrodes so as to induce and maintain an electric current flow therebetween through said selected portion of said geological formations under conditions which otherwise produce substantial adverse polarization effects at the surface of said electrodes, measuring and recording electrical effects of said current flow as characteristic of the nature of said portion of geological formation, and eliminating interference of gas and ion depletion polarization with the measured electrical effects of said current flow by the step of maintaining a field of radioactive radiation at at least one of said electrodes of sufficient intensity to at least partially ionize the material immediately adjacent said electrode.

2. A method according to claim 1 wherein said electrodes are pressed into contact with the exposed face of subterranean strata penetrated by a borehole in combination with the steps of moving said electrodes through said borehole and recording the variation of a characteristic of the electrical conductivity of the subsurface strata between said electrodes as a function of position of said electrodes within said bore.

3. A method according to claim 1 wherein said electrodes are widely spaced in contact with the surface of the earth whereby a current flow between said electrodes through the earth results in combination with the step of measuring at a point substantially at the earth's surface and between said electrodes an electrical effect induced by the subsurface current flow.

4. An apparatus for determining the geophysical properties of selected portions of underground geological formations which comprises at least two electrodes, means for maintaining said electrodes at spaced points in contact with a selected portion of said geological formations, a source of electrical energy, electrical conductors connecting said source to said electrodes to impress a voltage difference between said electrodes adapted to produce a current flow between said electrodes through said formation, said current flow otherwise producing substantial adverse polarization effects at the surface of said electrodes, a radioactive material incorporated in at least one of said electrodes adapted to generate high velocity particles effective at the electrode surface to at least partly ionize the adjacent medium, and instrument partly ionize the adjacent medium, and instrument means for measuring and recording an electrical effect of current flow between said electrodes through said geological formation independently of gas and ion depletion polarization effects.

5. An apparatus according to claim 4 wherein said radioactive material is an alpha particle emitting material and is physically incorporated into the surface of said electrode.

6. An apparatus according to claim 4 in combination with an elongated well logging instrument body, said electrodes being supported by and insulated from said body and adapted to be pressed into contact with exposed surfaces of subsurface strata penetrated by a borehole into the earth, a suspension cable attached to said instrument body and extending through said borehole to the earth's surface, said electrical conductors connected to said electrodes being insulated and extended through said borehole.

7. An apparatus according to claim 6 wherein said electrodes are flexible and extend radially from said instrument body into contact with the walls of said borehole and are pressed into and maintained in contact therewith by the flexure of said electrodes, said radioactive material being physically incorporated in an abrasion resistant tip disposed at the outer end of said electrodes.

8. An apparatus according to claim 6 wherein said instrument body is provided with a plurality of bow-shaped flexible body centralizers radially disposed about the periphery of said body and extending along a substantial length thereof, an insulated member supported by one of said centralizers, said electrodes being supported by and insulated from one another in said insulating member on its outer surface relative to said instrument body whereby said electrodes are pressed into and maintained in contact with the exposed surfaces of subsurface strata penetrated by said borehole.

9. An apparatus according to claim 4 wherein said electrodes are disposed at spaced points in contact with the earth's surface, said instrument means being disposed at a point between said spaced electrodes and disposed substantially at the earth's surface.

References Cited in the file of this patent

UNITED STATES PATENTS

| | | |
|---|---|---|
| 2,233,420 | Leonardon | Mar. 4, 1941 |
| 2,250,024 | Jakosky | July 22, 1941 |
| 2,256,742 | Jakosky | Sept. 23, 1941 |
| 2,307,887 | Haynes | Jan. 12, 1943 |
| 2,371,658 | Stewart | Mar. 20, 1945 |
| 2,395,623 | Goldstein et al. | Feb. 26, 1946 |
| 2,495,274 | Mayer | Jan. 24, 1950 |

FOREIGN PATENTS

| | | |
|---|---|---|
| 194,199 | Switzerland | July 1, 1938 |

UNITED STATES PATENT OFFICE
CERTIFICATE OF CORRECTION

Patent No. 2,799,003                                                          July 9, 1957

Theodore J. Nowak

It is hereby certified that error appears in the printed specification of the above numbered patent requiring correction and that the said Letters Patent should read as corrected below.

Column 5, line 25, beginning with "Centralizers" strike out all to and including the numeral and period "10." in line 28; column 6, lines 73 and 74, strike out "and instrument partly ionize the adjacent medium,".

Signed and sealed this 24th day of September 1957.

(SEAL)
Attest:

KARL H. AXLINE
Attesting Officer

ROBERT C. WATSON
                                                                                  Commissioner of Patents